United States Patent
Jones et al.

(10) Patent No.: US 8,291,564 B2
(45) Date of Patent: Oct. 23, 2012

(54) TELESCOPING TOOL ASSEMBLY AND METHOD FOR REFURBISHING WELDS OF A CORE SHROUD OF A NUCLEAR REACTOR VESSEL

(75) Inventors: William Dale Jones, Phoenix, AZ (US); Mark Broaddus, Rohnert Park, CA (US); Miguel Zamarripa, Aguascalientes (MX); Jamie Magdaleno, Aguascalientes (MX)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 876 days.

(21) Appl. No.: 12/415,385

(22) Filed: Mar. 31, 2009

(65) Prior Publication Data
US 2010/0242247 A1    Sep. 30, 2010

(51) Int. Cl.
*B23P 6/00*    (2006.01)
*G21C 17/003*    (2006.01)
(52) U.S. Cl. .......... 29/402.01; 29/723; 29/284; 376/249
(58) Field of Classification Search ................ 29/81.12, 29/402.01, 402.04, 402.05, 402.06, 434, 29/723, 284; 376/245, 249
See application file for complete search history.

(56) References Cited

U.S. PATENT DOCUMENTS

| | | | |
|---|---|---|---|
| 4,244,296 A * | 1/1981 | Vertut ........................ | 104/138.2 |
| 5,930,316 A | 7/1999 | Kowdley et al. | |
| 6,064,708 A * | 5/2000 | Sakamaki ..................... | 376/249 |
| 6,715,201 B2 * | 4/2004 | Sato et al. ....................... | 29/712 |
| 6,990,714 B2 * | 1/2006 | Sato et al. .................. | 29/402.01 |
| 7,092,477 B2 | 8/2006 | Wivagg et al. | |
| 7,769,123 B2 * | 8/2010 | Rowell et al. ................. | 376/249 |
| 2005/0135904 A1 * | 6/2005 | Wivagg et al. ........... | 414/222.01 |
| 2007/0030942 A1 | 2/2007 | Erbes | |

\* cited by examiner

*Primary Examiner* — Jermie Cozart
(74) *Attorney, Agent, or Firm* — Nixon & Vanderhye P.C.

(57) ABSTRACT

An assembly adapted to access a weld extending circumferentially around a core shroud of a nuclear reactor, wherein the core shroud is contained in a pressure vessel reactor, the assembly including: a baffle plate rail having a lower surface adapted to abut a baffle plate in a gap between the core shroud and the pressure vessel reactor; a telescoping rail slidably coupled to an upper region of the baffle plate rail, and a reciprocating rail slidably coupled to an upper region of the telescoping rail, wherein the reciprocating rail includes at least one of a weld conditioning tool, a weld inspection sensor and a weld repair device.

20 Claims, 5 Drawing Sheets

TELESCOPING TOOL ASSEMBLY AND METHOD FOR REFURBISHING WELDS OF A CORE SHROUD OF A NUCLEAR REACTOR VESSEL

BACKGROUND

The invention disclosed herein relates generally to a tool for inspecting, refurbishing or repairing welds in a nuclear reactor and, particularly, refurbishing welds around a core shroud of a boiling water nuclear reactor (BWR).

A BWR typically includes a generally cylindrical chamber that forms a wall of a pressure vessel and a core shroud within the pressure vessel. The core shroud contains the nuclear reactor core, and both are immersed in water/coolant that floods and flows through the pressure vessel.

Between the pressure vessel and the core shroud is an annular gap that extends around the shroud and has a width of about eighteen inches (0.45 m). The gap is filled with coolant/moderator that is circulated through the core by jet pumps. The gap provides an area for assemblies of jet pumps, piping and other components that are arranged on the outside of the core shroud and direct the coolant/moderator into the reactor core. The jet pump assemblies, piping and other components are typically deep down in the gap and submerged in coolant and moderator fluid. In addition, the gap provides a pathway for tools and instruments used to inspect and repair welds on the core shroud and the jet pump assemblies, piping and other components arranged in the gap.

Welds on the core shroud are subject to corrosion and cracking because they are immersed in coolant and water and because of other environmental conditions. The welds are periodically inspected refurbished and repaired. To reach the weld, the core shroud is opened and tools are lowered by cables down through the gap between the pressure vessel and the core shroud. It is particularly, difficult to lower tools and inspection instruments to welds and components deep down in the weld due to the narrow gap, the coolant/moderator fluid and the jet pump assemblies and other components in the gap. Specific tools, sensors and carriages to support the tools and sensors are needed to access welds and other components deep in the gap. One difficulty is securing a carriage to the core shroud or jet pump assembly while the tool or sensor on the carriage performs work on the core shroud or other component in the gap. For example, if the tool is a wire brush that refurbishes the weld by smoothing a weld the wire brush must be forcibly applied to the weld and the carriage must be firmly fixed to the shroud as the wire brush smoothes the weld. Accordingly, there is a long felt need for tools and instruments to access the welds in the gap between the shroud and pressure vessel.

SUMMARY

In one embodiment the invention is an assembly adapted to access a weld extending circumferentially around a core shroud of a nuclear reactor, wherein the core shroud is contained in a pressure vessel reactor, the assembly including: a baffle plate rail having a lower surface adapted to abut a baffle plate in a gap between the core shroud and the pressure vessel reactor; a telescoping rail slidably coupled to an upper region of the baffle plate rail, and a reciprocating rail slidably coupled to an upper region of the telescoping rail, wherein the reciprocating rail includes at least one of a weld conditioning tool, a weld inspection sensor and a weld repair device. Further, this assemblies of rails may be include braces to secure at least the baffle plate rail between a jet pump assembly and the core shroud while the reciprocating rail and the telescoping traverse rail move back and forth across the baffle plate rail.

In another embodiment the invention is an assembly to access and work a weld extending circumferentially around a core shroud of a nuclear reactor, wherein the core shroud is contained in a pressure vessel reactor containing liquid in which the core shroud is at least partially immersed, said assembly comprising: a baffle plate rail having a lower surface adapted to abut a baffle plate in a gap between the core shroud and the pressure vessel reactor, wherein the baffle plate includes a brace having a retracted position and an extended position in which the brace abuts a jet pump assembly in the gap; a telescoping rail slidably coupled to an upper region of the baffle plate rail, wherein the telescoping rail moves across at least one half of the length of the baffle plate rail while coupled to the baffle plate rail, and a reciprocating rail slidably coupled to an upper region of the telescoping rail, wherein the reciprocating rail includes at least one of a weld conditioning tool, a weld inspection sensor and a weld repair device.

A further embodiment of the invention is a method to move a tool assembly around at least a portion of a core shroud of a nuclear reactor core, wherein the core shroud is contained in a pressure vessel reactor, said method comprising: positioning a baffle plate rail of the tool assembly on a baffle plate in a gap between the core shroud and the pressure vessel reactor; bracing the baffle plate rail between the core shroud and a jet pump assembly; while the baffle plate rail is braced, moving a telescoping rail over a length of an upper portion of the baffle plate rail, and while the baffle plate rail is braced, moving a reciprocating rail over a length of an upper portion of the telescoping rail, wherein the reciprocating rail includes at least one of a weld conditioning tool, a weld inspection sensor and a weld repair device.

DETAILED DESCRIPTION

Figure 1:
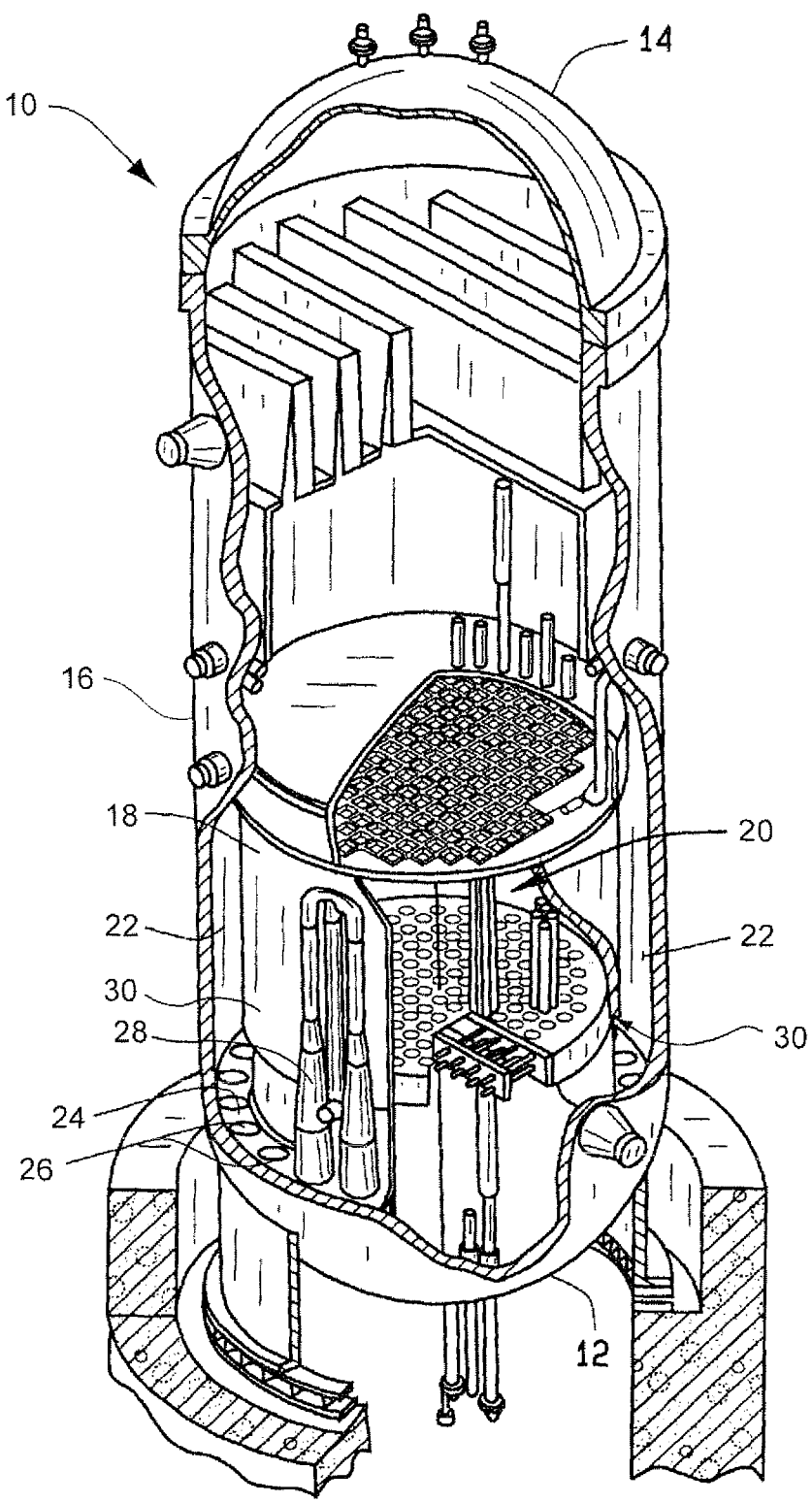
FIG. 1 is a perspective view of a boiling water reactor (BWR) with a cut away region to show a circumferential weld on a shroud and the annular gap between the shroud and pressure vessel.

FIG. 1 is a perspective view, with certain parts partially or completely removed, of a boiling water nuclear reactor (BWR) pressure vessel (RPV) 10. The RPV 10 has a generally cylindrical shape and is closed at opposite ends by a bottom head 12 and a removable top head 14. A cylindrical side wall 16 extends between the bottom head 12 and the top head 14. A cylindrically shaped core shroud 18 surrounds a reactor core 20. Coolant/water fills a substantial portion of the reactor core, core shroud, and pressure vessel.

Figure 2:
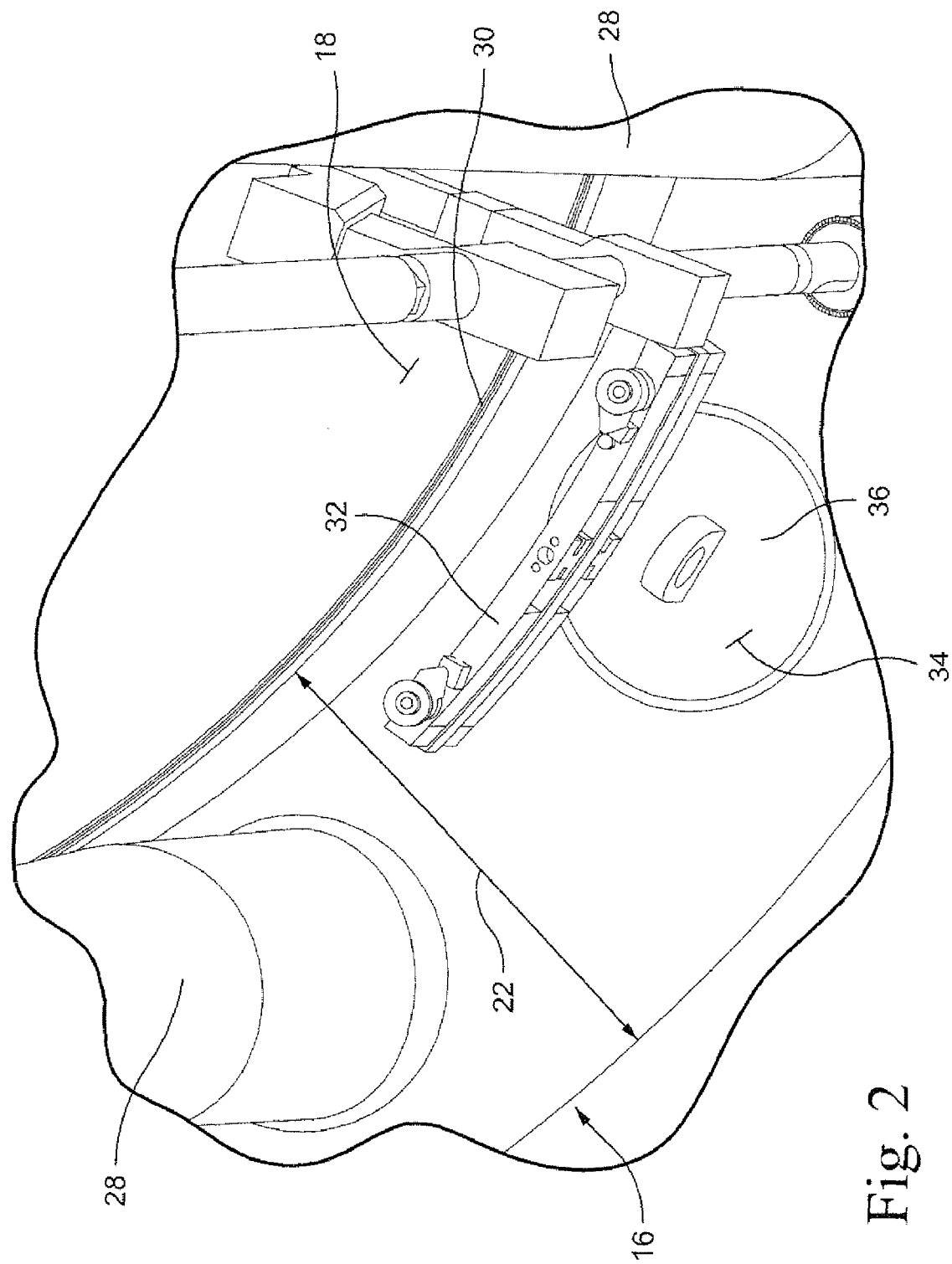
FIG. 2 is a perspective view of the gap between the pressure vessel and shroud, with portions of the vessel cutaway to show a weld inspection and repair tool that has been lowered down through the gap and is seated on the baffle plate.

An annular gap 22 is formed between the outside surface of the shroud 18 and the inside wall of the pressure reactor vessel (PRV). The width of the gap 22 may be about 18 inches (0.45 meters). At the bottom of the gap is a ring-shaped baffle plate (or pump deck) 24 that extends between the shroud 18 and the RPV 10. The baffle plate 24 includes a plurality of circular openings 26 through which extend housings for jet pump assemblies 28. The jet pump assemblies 28 extend up into the gap 22 and are circumferentially distributed around core shroud 18. The diameter of each of the jet pump assemblies is typically about 12 inches (0.3 m). FIG. 1 shows a single jet pump assembly with several openings 26 in the baffle plate to receive other jet pump assemblies. In practice, jet pump assemblies will be arranged on these openings 26 around substantially the entire circumference of the gap, with the exception of two openings 26 that are covered with a access cover 36 (as shown in FIG. 2).

A narrow gap having a width of about 3 inches (76 mm) exists between the shroud 18 and each of the pump assemblies 28. This narrow gap restricts access to a weld 30 that extends around the circumference of the shroud. This circumferential weld 30 extends around the shroud about six inches (150 millimeters) above the baffle plate 24. The weld 30 is deep in the gap and, for example, may be many feet below the top of the shroud 18 and submerged in the coolant/moderator fluid.

The circumferential weld 30 on the shroud may be refurbished by brushing the weld. Welds tend to corrode and crack due to small crevices and irregularities in the surface of the weld which may be subjected to residual tensile stress of the weld process. These small crevices and irregularities (and tensile stresses) may be removed by smoothing the surface of the weld, such as by brushing or penning the weld. Smoothing the surfaces of the weld tends to reduce the risk that a weld will develop cracks or breaks because the small crevices and irregularities where cracks generally start are removed and a compressive stress is imposed by the nature of the brushing process. Accordingly, there is a long felt desire for tools and instrument that can smooth the surface of a weld in the shroud of a BWR.

The annular gap 22 can be accessed from above the core shroud 18. While the reactor core is shut-down, the top head 14 of the RPV is removed. The annular gap 22 is typically accessed from above the open RPV by using cranes and other lifting mechanisms to lower instruments and tools into the gap. Moving the instruments and tools through the gap is difficult due to obstructions in the gap, where these obstructions include the jet pump assemblies 28. In addition, the gap 22 is filled with coolant/moderator. The instruments and tools should be capable of operating submerged in the coolant/moderator.

FIG. 2 is a perspective view of the gap 22 between the pressure vessel 10 and shroud 18, with portions of the vessel cutaway to show a weld inspection and repair tool 32 that has been lowered down through the gap and is seated on the baffle plate 24. The tool 32 is lowered vertically downward over a position 34 in the gap which is devoid of a jet pump assembly 28. Typically, there is a position 34 on the baffle plate 24 that does not have a jet pump assembly where an access cover exists for access to the region below the baffle plate. At this annular position 34, where a jet pump assembly would otherwise be positioned, is a circular flat cover 36 on the baffle plate. The lack of a jet pump assembly creates a vertical region above the circular cover 36 that is generally open in the gap 22 and provides relatively easy access to lower the tool 32 down through the gap and to the baffle plate 24.

As it is lowered, the tool may be maneuvered left and right, up and down, and partially rotated by cables that are attached to the tool and extend to the lifting crane above the RPV. Once positioned on the baffle plate, the tool positions adjacent the circumferential weld 30 a brush, peening device, inspection sensor, e.g., a video or ultrasound camera, or other instrument or sensors. As the tool works on or inspects the circumferential weld, the tool crawls around the circumference of the shroud. The movement of the tool may be simultaneously with the work performed on the weld, or occur after the tool has completed inspection or work on a section of the weld.

Figure 3:
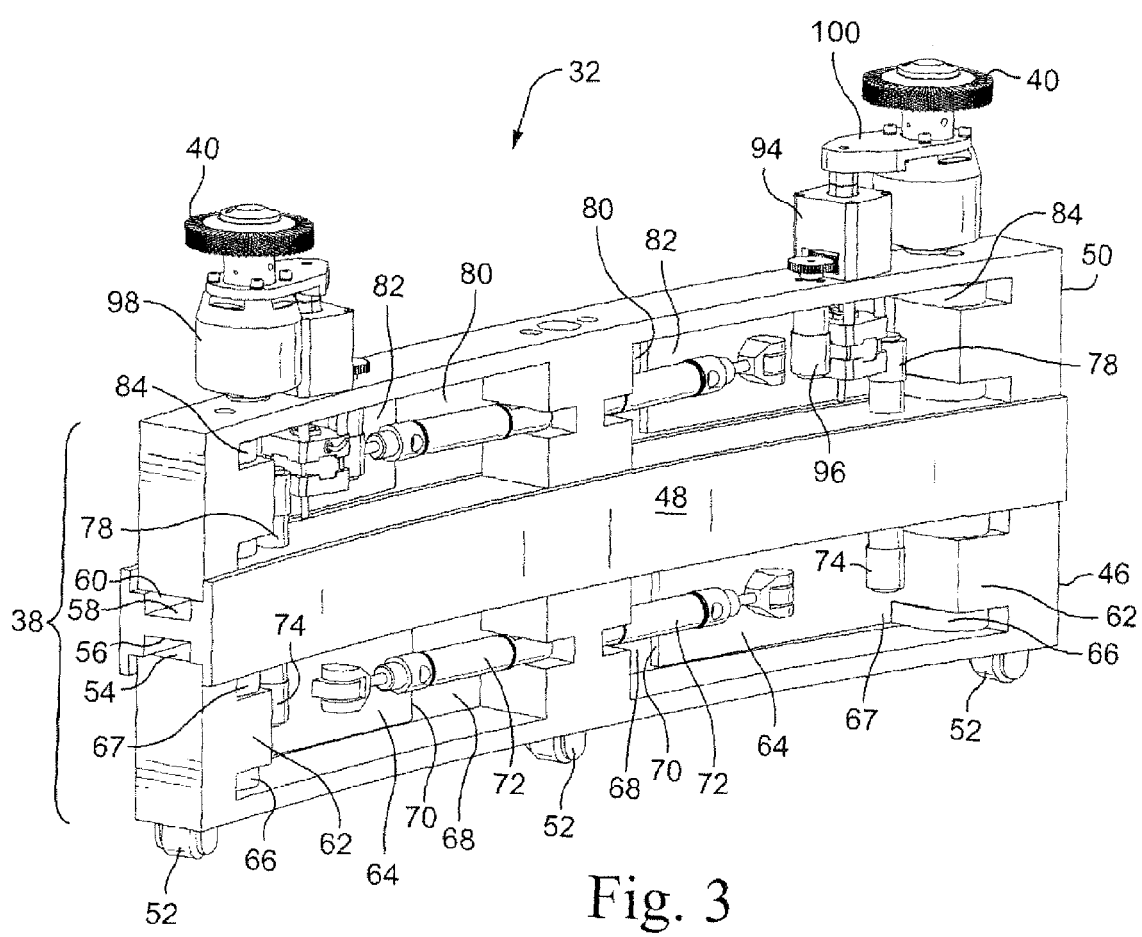
FIG. 3 is a front view of one embodiment of the tool which comprises a carriage supporting one or more tools, instruments or sensors, such as rotating wire brushes.

FIG. 3 is a front view of one embodiment of the tool 32 which comprises a carriage 38 and one or more tools, instruments or sensors, such as rotating wire brushes 40. The carriage 38 may have a height (h), e.g, 6 inches (152 mm), such that the tools 40 are positioned adjacent the weld when the carriage is seated on the baffle plate. The width (w) of the carriage 38 and tools, instruments and sensors on the carriage may be, for example, two inches (50 mm) and the length (L) of the carriage may be, for example, 18 inches (0.45 m). The carriage may have a slight arc along its length which conforms to the circumference of the shroud.

The dimensions, e.g., 50 mm×152 mm×450 mm, of the carriage 38 are preferably sufficiently small so that the tool 32 may be lowered by cables from the top of the shroud, down through the gap and to the baffle plate. Specifically, as the tool is lowered down through the gap it may be necessary to maneuver the tool by tilting, rotating, traversing and otherwise moving the tool downward through the gap and to the baffle plate. The small size of the tool allows the tool to move past obstructions in the gap and be positioned on the baffle plate between a core shroud and a jet pump assembly. As the tool moves downward through the gap, the cables support the tool maneuver the tool past different obstructions in the gap.

The carriage includes three rails 46, 48 and 50 which are each beams that slide with respect to each other. Each rail has a slight arc that conforms to the shape of the shroud. The lower rail 46 is a baffle plate rail and includes wheels or feet 52 that rest on the baffle plate. The baffle plate rail has an upper edge 54 that fits in a groove 56 on the middle rail 48, which is referred to as the telescoping traverse rail. The telescoping traverse rail 48 may have an I-beam shape with a lower groove 56 to receive an upper edge 54 of the baffle plate rail 46 and an upper groove 58 to receive a lower edge 60 of the upper rail 50, which is referred to as a reciprocating rail.

The baffle plate rail 46 supports the carriage while the tool, e.g., wire brush 40, is performing work on the weld 30 of the core shroud. The wheeled rollers 52 of the baffle plate rail 46 rest on the baffle plate. Preferably, the baffle plate rail and its rollers are stationary while the tool performs work on the weld.

In one embodiment, the baffle plate rail and wheels move across the baffle plate 24 and around the core shroud while the tool is at rest. The movement of the baffle plate rail 46 (and the entire tool 32) may be in an incremental manner in which baffle plate rail moves to a new location on the baffle plate. While at the new location, the baffle plate remains stationary while the tool performs its work on a section of the weld of the core shroud. After the work is completed on the weld section, the baffle plate moves to another location on the baffle plate to reposition the tool at a new second on the weld. At this other location, the tool performs work on the weld while the baffle plate rail remains stationary. This sequence of moving the baffle plate to reposition the tool and the tool then working on the weld while the baffle plate is stationary is repeated as the tool moves in steps around the core shroud.

The baffle plate rail 46 braces the carriage, so that the wire brush 40 or other tool or inspection sensor may perform work on or inspect the weld 30. For example, the baffle plate rail 46 may be braced to stabilize the tool 32 while the rotating wire brush 40 is applied to smooth the weld. The force between the wire brush and weld must be counteracted by the bracing action of the baffle plate rail. To counteract the force applied to the wire brush, the baffle plate rail is braced against the core shroud on an inside bracing surface 62 and by one or more bracing plates 64 that extend out from the rail and about against a wall of a jet pump assembly. The bracing plate(s) push the baffle plate rail radially inward against the core shroud. Because the baffle plate rail is securely held against the core shroud, the carriage and wire brush are stabilized so that it may apply force to the weld while performing work on the weld.

The bracing plates 64 may be pivotably attached to the baffle plate rail 46. A pivot joint 66 may be arranged on a vertical edge 67 in the baffle plate rail at one side of in a rectangular center opening 68 in the rail. The bracing plates 64 and their associated actuators are retracted within the opening 68 while the tool 32 is moved within the gap 22. A side edge of each bracing plate is attached to the pivot joint 66. The bracing plate may extend across substantially all of the opening 68 and may be recessed within the opening when retracted. The bracing plate may pivot from a first position wherein it is recessed within the opening to a second position wherein an opposite end 70 of the plate extends outward from the tool 32. The extended opposite end 70 of the plate 64 preferably abuts against a jet pump assembly and pushes the tool firmly against the core shroud. Specifically, as the extended opposite end 70 of the plate abuts against the jet pump assembly, the inside bracing surface 62 of the baffle plate rail is pressed against the core shroud. The inside bracing surface may be an inside wall of the baffle plate rail or may be a protruding cam that rotates about the pivot joint in conjunction with the pivoting movement of the bracing plate. The cam protrudes inward beyond the inside wall of the baffle plate rail as the bracing plate pivots outward. The cam retracts within the opening 68 in the baffle plate rail and the bracing plate pivots inward and retracts within the same opening. The cam or protrusion on the tool 32 abuts against the core shroud and provides a clearance between the other portions of the tool 32 and the core shroud. Accordingly, it is preferable that there be a pivoting cam or a protrusion on the inside wall of the baffle plate rail that extends inward beyond the other portions of the tool 32, including the traverse rail 48 and the reciprocating rail 50.

The actuators 72 that pivot the bracing plates 64 may be hydraulic, pneumatic or electrical telescoping shafts that are pivotably connected at one end to the bracing plate and an opposite end to an edge of the opening 68 in the baffle plate rail. As the telescoping shaft extends the bracing plate pivots outward and as the shaft retracts the bracing plate is pulled into the opening 68 in the baffle plate rail. The actuators are controlled by operators at the top of the core shroud and signal wires extend from the actuators to the operators. The signal wires may be included in the control cables coupled to the tool 32 that the operators use to maneuver the tool.

Figure 4:
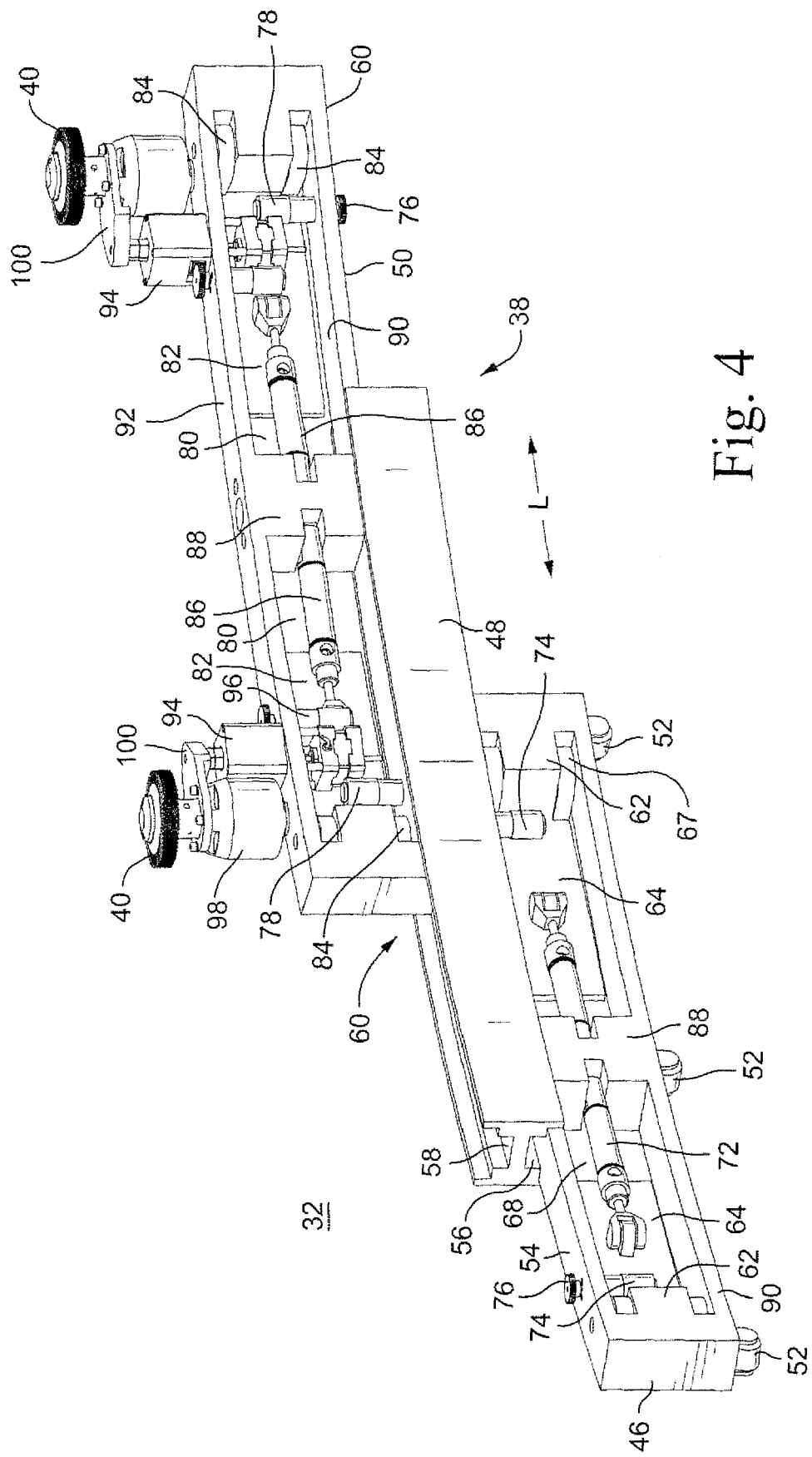
FIG. 4 is a perspective view of the weld inspection and repair tool in an extended position showing a side of the tool which faces the core shroud.

FIG. 4 is a perspective view of the weld inspection and repair tool 32 in an extended position. The view in FIG. 4 is of an inside face of the tool 32, where the inside face is oriented towards the core shroud. In the extended position, the telescoping traverse rail 48 has moved laterally along the upper edge 54 of the baffle plate rail 46 such that a substantial portion, e.g., more the fifty percent and preferably more than 75 percent, of the length of the telescoping traverse rail is beyond an end of the baffle plate rail. Similarly, the reciprocating rail 50 has moved laterally along the upper groove 58 of the telescoping traverse such that a substantial portion, e.g., more than fifty percent and preferably more than 75 percent, of the length of the reciprocating rail extends beyond the end of the telescoping traverse rail. In the extended position, the length (L) of the tool 32 may be twice or more the length of the tool when the rails 46, 48 and 50 are one over the other in a non-extended position (as shown in FIG. 3).

The traverse rail 48 has an I-beam shape arranged on its side. The bottom side of the traverse rail slidably rests on the upper edge 54 of the baffle plate rail. The bottom side of the traverse rail includes a lower groove 56 that generally conforms to the upper edge 54 of the baffle plate rail such that the traverse rail is secure when resting on the baffle plate rail. An inside surface of the lower groove 56 includes a raceway of teeth which engage the gears rotatable attached to the drive motors 74. The traverse rail is moved laterally by the drive motors to advance the rail 48 over the baffle plate rail 46. A key or ridge at the junction between the upper edge 54 and the lower groove 56 ensures that the traverse rail does not fall off the baffle plate rail 46 when the traverse rail is fully extended.

Gear drive motors drive the rails as they slide over an underlying rail. To drive the telescoping traverse rail across the baffle plate rail, gear motors 74 are mounted on the baffle plate rail, such as on a side of the center opening 68. These drive motors turn gear 76 that engage a gear tooth track on the lower groove 56 of the traverse rail 48. The gear tooth track is oriented, e.g., vertically, to engage the gear 76 on the gear motor. The gears turned by the drive motors 74 move the traverse rail 48 laterally with respect to the baffle plate rail. There may be two drive motors 74 that are each oriented towards an end of the baffle plate rail. Two drive motors are generally needed because the movement of the traverse rail 48 across the baffle plate rail 46 will cause the traverse rail to extend past and thus disengage from the drive motor 74 at an end of the baffle plate rail opposite from the direction of movement, as is shown in FIG. 4.

Similarly, gear drive motor 78 are arranged on the reciprocating rail 50 and extend downwardly to gears at the lower edge 60 of the rail. The traverse rail 48 has an upper groove 58 that receives the lower edge 60 of the reciprocating rail 50. The upper groove 58 includes a raceway with teeth to engage gears of drive motors 78 mounted in center open areas 80 of the reciprocating rail. These gears engage a gear tooth track in the upper groove 58 of the traverse rail. The gear drive motors 78 drive the reciprocating rail 50 laterally across the telescoping traverse rail. The gear drive motors 74 and 78 may be controlled by an operator at the top of the core shroud. A signal line, e.g., a wire, may extend between each of the gear motors and a control system at the top of the core shroud.

The reciprocating rail 50 has bracing plates 82 similar to bracing plates 64 in the baffle plate rail 46. The bracing plates 82 are arranged in the center open areas 80 of the reciprocating rail. The bracing plates are pivotably mounted at a pivot joint 84 mounted to opposite ends of the open areas. A telescoping actuator 86 is, at one end, attached to each of the bracing plates 82 and at the other end attached to a center post 88 of the reciprocating rail. The center post 88 is firmly attached to the rectangular frame 90 of the rail. The center post supports an end of each of the telescoping actuators 86 in the reciprocating rail. A similar center post 88 is arranged in the frame 90 of the baffle plate rail 46.

The frame 90 and center post 88 may provide a generally rigid structure for each of the baffle plate rail and the reciprocating rail. Similarly, the I-beam structure of the telescoping traverse rail is a generally rigid structure. A metallic material may be used to form the frame, center post and other structural components of the tool 32. Metallic materials provide structural rigidity for the tool.

An upper portion of the reciprocating rail 50 supports a tool or sensor assembly 92 that may includes rotating wire brushes 40. One or more tool or sensor assemblies may be mounted on the upper portion of the rail 50. These assemblies may all include the same tool or sensor, such as a wire brush, or may include different tools and sensors, such as a wire brush and a weld inspection sensor. Each assembly 92 may include an elevator mechanism 94 and a torsion motor 96 mounted in the center open area 80 of the reciprocating rail. The elevator mechanism 94 moves the wire brush (or other tool or sensor) vertically to position the wire brush at the same elevation as the weld to be refurbished on the core shroud. The elevator mechanism may be an extendable shaft that has helical threads engaging the torsion motor 96. An operator controls the elevator mechanism using a control system that actuates the motor to raise or lower the extendable shaft and thereby position the brush at a desired elevation. The extendable shaft may be supported in a housing fixed to the upper portion 92 of the reciprocating rail. A torsion motor may be used to pivot the splined elevator shaft to move the brush against the core shroud and apply pressure to the brush. The torque of the torsion motor may be regulated to control the pressure of the brush against the core shroud.

The wire brush 40 may be driven by a brush drive motor 98 that is supported by a bracket 100 on an upper end of the extendable shaft of the elevator mechanism. The brush drive motor rotates the wire brush. The rotation of the wire brush against the weld 30 smoothes the surface of the weld and removes metallic burrs and other small irregularities on the weld. Smoothing the weld and removing small irregularities refurbishes the weld and reduces the tendency of the weld to crack.

As the wire brushes 40 smooth the weld 30, the reciprocating rail 50 is moved slowly laterally across the telescoping rail. This movement causes the brushes to move over the weld in a circumferential direction around the core shroud. The reciprocating rail may move back and forth in a few cycles while the brushes are vertically moved to slightly different elevations, e.g., vertical movements of about 0.25 inch (10 mm). The back and forth movements and adjusting the elevations of the wire brushes ensures that the entire height of the weld is acted on by the brushes and allows the brushes to make multiple passes over the weld.

The cycle back and forth movements of the reciprocating rail may be performed while the telescoping rail is held at one end of the baffle plate rail. Once the cycle is completed, the telescoping rail is moved to the other end of the baffle plate rail, and the cycle of back and forth movements are preformed again by the reciprocating rail. The lateral movement of the telescoping rail move the brushes to another circumferential region of the weld. The baffle plate rail 46 is braced between a jet pump housing and the core shroud while the reciprocating rail cycles back and forth and while the telescoping rail repositions the reciprocating rail from one side of the baffle plate rail to another.

Figure 5:
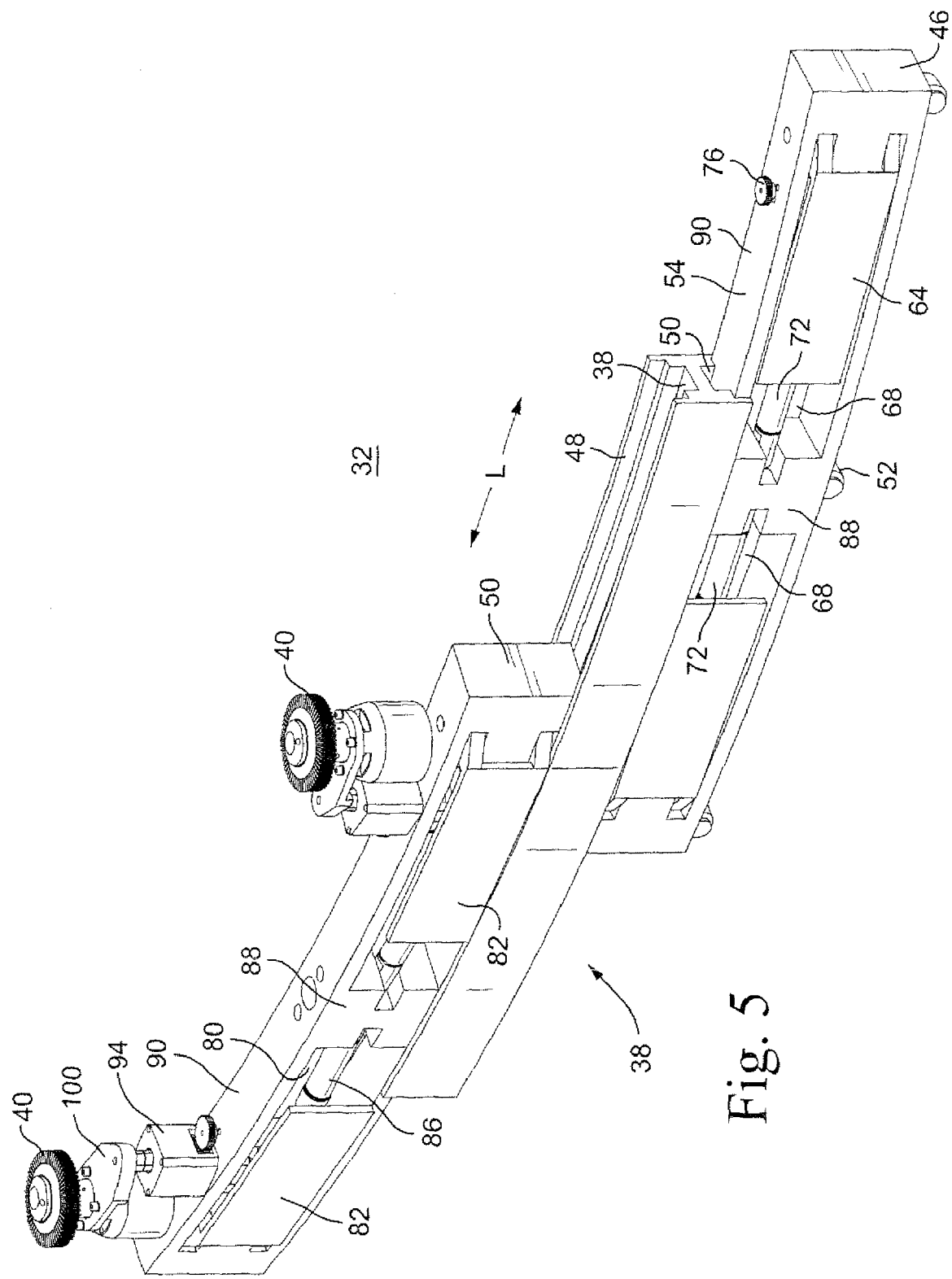
FIG. 5 is a perspective view of the weld inspection and repair tool in an extended position showing a side of the tool which faces the jet pump assemblies.

FIG. 5 is a perspective view of the weld inspection and repair tool 32 in an extended position, wherein the view shows the outer side surface of the carriage 38 which faces the jet pump assemblies. In operation, the weld inspect and repair tool 32 is lowered into position such that its wheels are on the baffle plate 24 in the gap 22 between the pressure vessel 10 and core shroud 18. While being lowered and positioned the rails 46, 48 and 50 are superimposed one over the other such that the carriage 38 has a length equal to the length of a single one of the rails. Preferably, the tool 32 is lowered down over an area 34 without a jet pump assembly. The control cables that lowered the tool 32 maneuver the tool between the core shroud and a pair of jet pump assemblies 28. Once the outer side of the carriage 38 for the tool 32 is between the pair of jet pump assemblies, the bracing plates 64 of the baffle plate rail 46 are extended such that each plate abuts against one of the jet pump assemblies. As each of the plates 64 abuts against a respect one of the pair of jet pump assemblies, the inside bracing surface 62 on the baffle plate rail is push solidly against the core shroud. The bracing plates apply sufficient force to hold the baffle plate rail securely and rigidly against the core shroud as the telescoping traverse rail and reciprocating rail move and as the brushes 40 smooth the weld.

The baffle plate rail 46 remains stationary while the weld is brushed and the telescoping traverse rail and reciprocating rail move, and the brushes smooth the weld. After the brushes have completed smoothing the section of weld that can be reached while the baffle plate rail is stationary, the carriage 38 begins to move the baffle plate rail to another position on the baffle plate between an adjacent pair of jet pump assemblies.

Before the baffle plate rail is moved, the telescoping traverse rail and reciprocating rail are superimposed over the bracing plate rail (as shown in FIG. 3). Thereafter, the bracing plates 82 on the reciprocating rail 50 are extended to abut the same pair of jet pump assemblies against which abut the bracing plates 64 on the baffle plate rail 46. The abutting engagement between the jet pump assemblies and the bracing plates 82 secures the reciprocating rail to a stationary position. After the bracing plates 82 on the reciprocating rail abut the pair of jet pump assemblies, the bracing plates 64 on the baffle plate rail 46 are retracted into the opening 68 of the rail. Retracting these plates 64 allows the baffle plate rail to be moved circumferentially around the gap 22 and across the baffle plate 24. The reciprocating rail 50 remains stationary while the rail drive motors 78 extend the telescoping traverse rail 48 laterally from the reciprocating rail and the rail drive motors 74 extend the baffle plate rail 46 laterally from the telescoping traverse rail 48.

When the telescoping traverse rail and baffle plate rail have been fully extended from the reciprocating rail, the carriage 38 appears as shown in FIGS. 4 and 5. By extending the baffle plate rail 46, such as a distance equal to the length (L) of one of the rails 46, 48, 50, the baffle plate rail is again positioned between a pair of jet pump assemblies. The length of the rails is preferably equal to the distance between jet pump assemblies in the annular gap 22. Once the baffle plate rail 46 is extended to be between the next jet pump assemblies, the bracing plates 64 of the baffle plate rail are extended to abut against these next jet pump assemblies and to again secure the baffle plate rail against the core shroud. Once the baffle plate rail is secured, the bracing plates 82 are retracted from the prior pair of jet pump assemblies and into the reciprocating rail 50.

With the bracing plates 82 retracted, the reciprocating plate 50 is free to move back and forth to smooth another section of the weld on the core shroud. The sequence of: (i) bracing the baffle plate rail between a pair of jet pump assemblies and the core shroud, (ii) smoothing, inspecting or otherwise performing work on the weld or other section of the core shroud by advancing a brush, tool or second through lateral movements of the telescoping traverse rail and the reciprocating rail, (iii) bracing the telescoping rail between the pair of jet pump assemblies and the core shroud, and (iv) releasing the braces of the baffle plate rail and extending that rail and the telescoping traverse rail to a next position around the core shroud, is repeated to advance the weld inspect and repair tool 32 around the core shroud and over the baffle plate. When the tool 32 has moved around the core shroud, the tool is positioned over the open position 34 on the baffle plate 24 and lifted out of the gap between the pressure vessel and core shroud.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly adapted to access a weld extending circumferentially around a core shroud of a nuclear reactor, wherein the core shroud is contained in a pressure vessel reactor, said assembly comprising:
    a baffle plate rail having a lower surface adapted to abut a baffle plate in a gap between the core shroud and the pressure vessel reactor;
    a telescoping rail slidably coupled to an upper region of the baffle plate rail, and
    a reciprocating rail slidably coupled to an upper region of the telescoping rail, wherein the reciprocating rail includes at least one of a weld conditioning tool, a weld inspection sensor and a weld repair device.

2. The assembly in claim 1 wherein the baffle plate rail, telescoping rail and reciprocating rail are each arched to conform to a curvature of an outer wall of the core shroud.

3. The assembly in claim 1 wherein the baffle plate rail includes at least one extendable brace having a closed position adjacent the baffle plate rail and an extended position in which the brace extends beyond the baffle plate rail.

4. The assembly in claim 3 wherein the brace is at least one panel pivotably attached to the baffle plate rail.

5. The assembly in claim 3 wherein the brace, when in the extended position, abuts a jet pump assembly when the assembly is positioned in the gap between the jet pump assembly and the core shroud.

6. The assembly in claim 3 wherein the reciprocating rail includes at least one extendable brace having a closed position adjacent the reciprocating rail and an extended position abutting an jet pump assembly.

7. The assembly in claim 1 wherein the at least one of a weld conditioning tool, a weld inspection sensor and a weld repair device, includes a brush motor and a brush rotatably driven by the brush motor, and wherein the brush movable to be aligned with the circumferential weld.

8. The assembly in claim 1 further comprising a first gear motor engaging a slidable coupling between the telescoping rail and the baffle plate rail, wherein the first gear motor drives the slidable coupling to move the telescoping rail laterally with respect to the baffle plate rail.

9. An assembly to access and work a weld extending circumferentially around a core shroud of a nuclear reactor, wherein the core shroud is contained in a pressure vessel reactor containing liquid in which the core shroud is at least partially immersed, said assembly comprising:
    a baffle plate rail having a lower surface adapted to abut a baffle plate in a gap between the core shroud and the pressure vessel reactor, wherein the baffle plate includes a brace having a retracted position and an extended position in which the brace abuts a jet pump assembly;
    a telescoping rail slidably coupled to an upper region of the baffle plate rail, wherein the telescoping rail moves across at least one half of the length of the baffle plate rail while coupled to the baffle plate rail, and
    a reciprocating rail slidably coupled to an upper region of the telescoping rail, wherein the reciprocating rail includes at least one of a weld conditioning tool, a weld inspection sensor and a weld repair device.

10. The assembly in claim 9 wherein the reciprocating rail moves back and forth across the telescoping rail while the brace is in the extended position.

11. The assembly in claim 9 wherein the reciprocating rail includes at least one extendable brace having a closed position adjacent the reciprocating rail and an extended position abutting the jet pump assembly while the brace of the baffle plate rail is in the retracted position.

12. The assembly in claim 9 wherein the brace of the baffle plate rail is a panel pivotably attached to the baffle plate rail.

13. The assembly in claim 9 wherein the at least one of a weld conditioning tool, a weld inspection sensor and a weld repair device, includes a brush motor and a brush rotatably driven by the brush motor, and wherein the brush is aligned with the circumferential weld.

14. The assembly in claim 9 further comprising a first gear motor engaging a slidable coupling between the telescoping rail and the baffle plate rail, wherein the first gear motor drives the slidable coupling to move the telescoping rail laterally with respect to the baffle plate rail.

15. A method to move a tool assembly around at least a portion of a core shroud of a nuclear reactor, wherein the core shroud is contained in a pressure vessel reactor, said method comprising:
    positioning a baffle plate rail of the tool assembly on a baffle plate in a gap between the core shroud and the pressure vessel reactor;
    bracing the baffle plate rail between the core shroud and a jet pump assembly;
    while the baffle plate rail is braced, moving a telescoping rail over a length of an upper portion of the baffle plate rail, and
    while the baffle plate rail is braced, moving a reciprocating rail over a length of an upper portion of the telescoping rail, wherein the reciprocating rail includes at least one of a weld conditioning tool, a weld inspection sensor and a weld repair device.

16. The method of claim 15 wherein the reciprocating rail moves back and forth across the upper portion of the telescoping rail while the at least one of the weld conditioning tool, the weld inspection sensor and the weld repair device are aligned with a circumferential weld on the shroud.

17. The method of claim 15 further comprising bracing the reciprocating rail between the shroud and the jet pump assembly, releasing the baffle plate rail from bracing and thereafter moving the baffle plate rail along a length of the telescoping rail.

18. The method of claim 17 further comprising bracing the baffle plate rail between another jet pump assembly and the shroud after moving the baffle plate rail along the length of the telescoping rail.

19. The method of claim 15 wherein bracing the baffle plate rail includes a plate attached to the baffle plate rail pivoting into engagement with the jet pump assembly.

20. The method of claim 15 wherein a length of the tool expands by extending the telescoping rail along the baffle plate rail, and extending the reciprocating rail along the telescoping rail.

* * * * *